((12)) United States Patent
Gebelin

(10) Patent No.: US 7,971,692 B2
(45) Date of Patent: Jul. 5, 2011

(54) ANTISEISMIC PAD, DEVICE FOR SUPPORTING A STRUCTURE AND USE THEREOF

(75) Inventor: Bernard Gebelin, Lyons (FR)

(73) Assignee: Areva NP, Courbevoie (FR)

( * ) Notice: Subject to any disclaimer, the term of this patent is extended or adjusted under 35 U.S.C. 154(b) by 1182 days.

(21) Appl. No.: 10/587,407

(22) PCT Filed: Dec. 16, 2004

(86) PCT No.: PCT/FR2004/003265
§ 371 (c)(1),
(2), (4) Date: Jul. 26, 2006

(87) PCT Pub. No.: WO2005/083206
PCT Pub. Date: Sep. 9, 2005

(65) Prior Publication Data
US 2007/0158133 A1    Jul. 12, 2007

(30) Foreign Application Priority Data
Jan. 30, 2004    (FR) .................................... 04 00919

(51) Int. Cl.
*E04H 9/02*    (2006.01)
*F16F 15/04*    (2006.01)

(52) U.S. Cl. ........ 188/378; 267/136; 248/621; 248/638; 52/167.6

(58) Field of Classification Search .......... 188/378–380; 267/136; 52/167.1–167.6; 248/609, 621, 248/634, 636, 638
See application file for complete search history.

(56) References Cited

U.S. PATENT DOCUMENTS

| 2,014,643 | A | * | 9/1935 | Bakker .......................... 384/49 |
| 4,514,941 | A | * | 5/1985 | Gonzalez Flores .......... 52/167.5 |
| 4,917,211 | A | | 4/1990 | Shibata et al. |
| 4,978,581 | A | * | 12/1990 | Fukahori et al. .............. 428/492 |
| 5,261,200 | A | * | 11/1993 | Sasaki et al. .................. 52/167.5 |
| 5,599,106 | A | | 2/1997 | Kemeny |
| 5,904,010 | A | * | 5/1999 | Javid et al. ................... 52/167.7 |
| 6,244,015 | B1 | * | 6/2001 | Ito et al. ....................... 52/741.1 |
| 6,321,492 | B1 | | 11/2001 | Robinson |
| 7,237,364 | B2 | * | 7/2007 | Tsai .............................. 52/167.6 |

FOREIGN PATENT DOCUMENTS

| JP | A-64043643 | 2/1989 |
| JP | A-01-122536 | 8/1989 |
| JP | U-3044121 | 9/1997 |
| JP | A-10-088857 | 4/1998 |
| WO | 01/42593 | 6/2001 |

* cited by examiner

*Primary Examiner* — Christopher P Schwartz
(74) *Attorney, Agent, or Firm* — Davidson, Davidson & Kappel, LLC

(57) ABSTRACT

An antiseismic support pad having a base for supporting and holding the pad on a support surface, at least one spherical rolling element mounted to rotate freely about a center of rotation in a bearing secured to the support base, and a support plate resting on the spherical rolling element via a concave bearing surface, the pad being characterized by the fact that the support base comprises a soleplate secured to at least one bearing, configured to rest freely on the support surface and to hold the pad in place on the support surface without a fastener, and that the support pad includes an arrangement configured to suspend the support base from the support plate and move the base resiliently in radial directions about a support plate axis that is substantially perpendicular to the soleplate, the arrangement connected firstly to the support plate and secondly to the support base comprising the soleplate and the bearing.

11 Claims, 7 Drawing Sheets

ANTISEISMIC PAD, DEVICE FOR SUPPORTING A STRUCTURE AND USE THEREOF

FIELD OF THE INVENTION

The invention relates to an antiseismic support pad and to a support device for supporting a structure, in particular a vertical structure of great height that can be moved and installed on an industrial site, in particular in a nuclear power station.

BACKGROUND INFORMATION

Nuclear power stations having one or more reactors in which fuel assemblies are used, generally include one or more fuel buildings adjacent to the reactor building and in which there are performed operations of removing spent fuel assemblies, of examining and repairing said fuel assemblies, and of preparing to load the reactor with new assemblies or with refurbished assemblies. The fuel building generally contains a spent fuel storage pool which can be put into communication with a pool of the nuclear reactor. Within the fuel pool, it is generally necessary to perform complex operations of examining and measuring spent fuel assemblies and possibly also operations of repairing and refurbishing fuel assemblies.

Fuel assemblies for water-cooled nuclear reactors, and in particular fuel assemblies for nuclear reactors cooled by pressurized water, which are in the form of right prisms and are disposed vertically in the core of the reactor, are of great length and small cross-section, where these assemblies can present a length of about 4 meters (m) or even more and a square section having a side of about 0.20 m. Fuel rods are inserted into the fuel assembly support structure to constitute a bundle occupying the major part of the length of the fuel assembly.

In order to perform the operations of inspecting, visually examining, or taking measurements on fuel assemblies, it is necessary to have a tall structure (e.g. about 5 m tall) into which each of the fuel assemblies for inspection is inserted in succession in a vertical disposition, the support structure also having means for guiding and moving auxiliary devices for examining, inspecting, or taking measurements, in particular for moving the devices in a vertical direction.

The installation for inspecting fuel assemblies constitutes a structure that is tall and slender, and that needs to be placed inside the fuel pool so as to stand on the bottom of the pool in a zone where fuel assemblies are to be inspected and examined.

It is generally advantageous to make installations for inspecting and examining fuel assemblies as to enable them to be transported from one fuel building to another, on a given site or even between different nuclear power station sites. This makes the use of such installations more profitable, given that they are needed only from time to time in the lifetime of a nuclear power station, e.g. when loading or reloading fuel assemblies into the core of a nuclear reactor.

It is also desirable for it to be possible to place the examination and inspection installation in a zone of the fuel pool that can be selected as a function of the position of the spent fuel assembly storage racks in the fuel pool. It is therefore necessary to have structure support means that are entirely stable, enabling the vertical position of the structure to be adjusted, and including means for resting on the bottom of the pool that can easily be separated from the bottom of the pool or put into place and adjusted in order to install the structure in a pool.

The bottom of a fuel pool is generally constituted by a slab of concrete covered by a covering of stainless steel which constitutes the support surface of the structure. Said support structure may present certain departures from planeness and/or from the horizontal, so it must be possible to adjust the vertical direction of the structure supporting the examination and inspection installation before it is put into operation, since it is necessary for the installation to be vertical in order for the auxiliary examination and inspection means to be moved and adjusted in satisfactory manner.

In addition, it can be necessary to provide antiseismic support for the examination and inspection installation structure so as to avoid any risk of the inspection structure toppling or being destroyed, and to avoid any risk of the fuel assembly under examination being damaged, in the event of an earthquake of potentially large magnitude occurring, as can happen in at least some zones where nuclear power stations are installed.

Various types of support device or antiseismic pad are known that can be used for protecting certain buildings, in particular dwellings or industrial buildings such as the buildings of a nuclear power station, or indeed civil engineering works such as bridges. Such antiseismic support devices comprise a support base that is permanently secured to a support surface, which surface may be the surface of the ground, a foundation, or a support element of a civil engineering work, a support and bearing plate secured to the structure that is to be supported, or sliding or rolling means interposed between the support plate and the support base.

For example, as described in U.S. Pat. No. 5,599,106 and in WO 01/42593, it is possible to use rolling elements such as balls or rollers interposed between bearing plates having rolling and bearing surfaces for the rolling elements. A bottom bearing plate of the support device is permanently secured to the ground or to a civil engineering work. At least one top bearing plate resting on the rolling elements is designed to move in limited manner relative to the support base, in the event of an earthquake leading to forces being applied in arbitrary directions.

Such devices which are anchored to the ground or to a civil engineering element and which remain permanently on the ground or on the civil engineering element, cannot be used in support pads for a transportable structure that needs to be put into place preferably simultaneously with its antiseismic support pads and that must include adjustment means, in particular for adjusting its vertical direction.

Rolling means are also known that are referred to as handling balls which enable heavy objects to be moved in any direction on a bearing surface or against a guide surface. Such handling balls comprise a spherical rolling element mounted to rotate freely in a ball bearing secured to a support base for the handling ball, for supporting it on a support or guide surface. Such handling balls with very low friction and having a center of spherical rotation permitting displacements in arbitrary directions can be most advantageous in antiseismic support devices. Until now such devices have been restricted to the field of handling.

SUMMARY

The objective of the invention is thus to provide an antiseismic support pad comprising a base for supporting and holding the pad on a support surface, at least one spherical rolling element mounted to rotate freely about a center of rotation in a bearing secured to the support base, and a support plate resting on the spherical rolling element, this support pad being capable of being used to support a transportable structure without fittings being provided on the support surface, and also enabling the vertical direction of the structure to be adjusted.

For this purpose, the support base comprises a soleplate secured to a bearing, made to rest freely on the support surface and to hold the pad in place on the support surface without a fastener, and that the support pad includes at least three arrangements for suspending the support base from the support plate and for urging it resiliently in radial directions about a support plate axis that is substantially perpendicular to the soleplate, to be connected firstly to the support plate and secondly to the assembly comprising the soleplate and the bearing.

The invention also relates to a support device for supporting a structure, in particular a structure that is tall and slender and that needs to have its vertical direction adjusted.

According to particular features taken in isolation or in combination:

the concave surface of the support plate bearing against the spherical rolling element is a surface of revolution having one of the following shapes: spherical, conical, paraboloidal, ellipsoidal;

the pad has a single spherical rolling element rotatably mounted in a ball bearing having a center of rotation disposed on the axis of the support plate;

the pad comprises a plurality of spherical rolling elements each disposed in a respective bearing, the centers of rotation of the bearings being disposed on at least one circle centered on the axis of the plate;

a central one of the bearings presents a center of rotation on the axis of the plate, and the other bearings of the plurality of bearings are disposed around the axis in such a manner that the centers of rotation of the spherical rolling elements of the other bearings of the plurality of bearings are disposed on a circle centered on the center of rotation of the central bearing;

the suspension and resilient return arrangement are constituted by at least three coil springs, each connected at a first longitudinal end to a peripheral portion of the support plate and at a second longitudinal end to an outer peripheral portion of the support base disposed inside the peripheral portion of the support plate, each of the springs having a longitudinal direction extending substantially radially relative to the plate and being upwardly inclined from the outer peripheral portion of the support base towards the peripheral portion of the plate, the springs being prestressed in traction so as to urge the support base of the bearing and of the rolling element resiliently towards a position that is centered relative to the axis of the support plate and to put the spherical rolling element into contact with an inner bearing surface of the plate while the soleplate is not in contact with a support surface, the support base being freely suspended from the plate via the springs; and the support plate has a top portion in the form of a bushing having its axis on the axis of the support plate, the bushing being internally tapped over at least a fraction of its length and including a guide slot opening out in its outer side surface and extending along the axis of the support plate, and the antiseismic pad further includes an actuation shaft having a threaded portion engaged by screw-fastening in the tapped portion of the bushing of the plate along the axis of the plate, and at least one guide and engagement part in which the shaft is mounted to rotate about the axis of the support plate and secured in translation with the at least one guide part including a guide element having a guide peg inserted in the slot of the bushing of the plate for guiding it in axial translation, whereby turning the shaft secured in axial translation with at least one engagement and guide part so as to screw it in or out relative to the tapped opening of the bushing of the plate, causes the engagement and guide part to move in translation along the axis of the plate relative to the support plate.

The invention also relates to a support device for supporting a structure of a transportable installation capable of being put into place on a support surface, the support device comprising at least three antiseismic support pads in accordance with the invention as defined above, and a rigid frame resting on the support plates of the antiseismic pads.

The support device can be used to adjust the vertical direction of a tall and slender structure of an installation that is secured to the support device; under such circumstances, it includes at least one adjustable antiseismic pad as described above in which the engagement and guide part is secured to the rigid frame of the support device and is movable in translation along the axis of the support plate of the antiseismic pad by turning the actuation shaft. The support device may have a frame of generally square or rectangular shape and four adjustable antiseismic pads, each secured via its engagement and guide part to a respective corner portion of the frame.

The invention also relates to the use of a support device in accordance with the invention for supporting an installation for examining and inspecting nuclear power assemblies in a pool of a nuclear power station, the installation being totally independent and capable of being installed without fittings in the pool of the nuclear power station, because it is designed to stand on the bottom of the pool via the soleplates of support devices, and has its own arrangement for handling fuel assemblies, thus making it possible to avoid any reliance on fuel assembly handling means of the power station.

BRIEF DESCRIPTION OF THE DRAWINGS

In order to make the invention well understood, there follows a description by way of example and with reference to the accompanying figures of a structure of an installation for examining and inspecting dual assemblies and its support means on the bottom of a pool, including antiseismic support pads in accordance with the invention.

DETAILED DESCRIPTION

Figure 1:
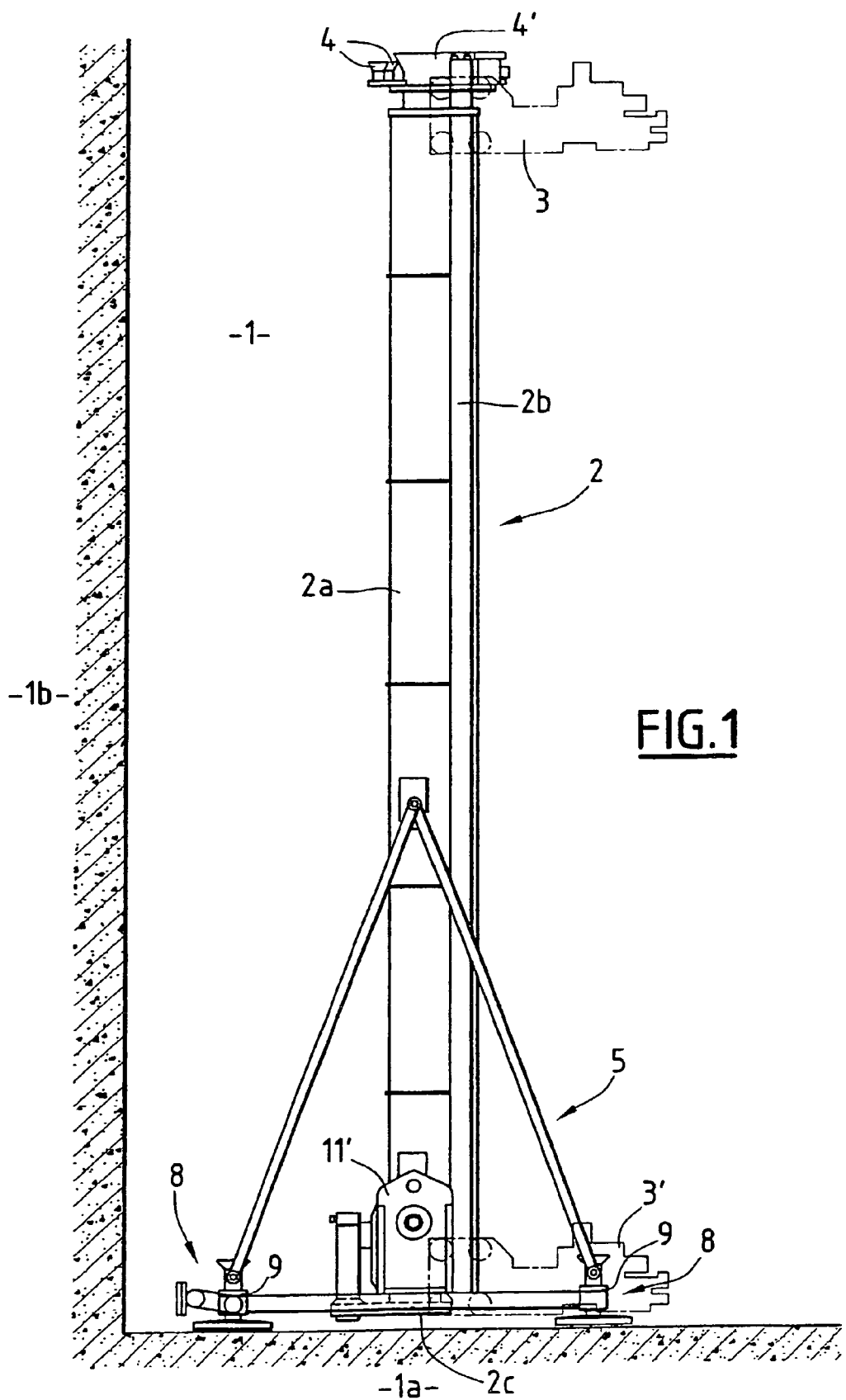
FIG. 1 is an elevation view of an installation for examining and inspecting fuel assemblies resting on the bottom of a pool in a nuclear power station.

FIG. 1 shows, inside a portion of a fuel pool 1 in a nuclear power station, an installation 2 for inspecting and examining fuel assemblies.

The pool 1 comprises a horizontal bottom 1a and a vertical wall 1b constituted by concrete walls covered in stainless steel sheet.

The installation 2 for examining and inspecting fuel assemblies comprises a vertical structure 2a that is tall and slender, i.e. presents height that is much greater than its transverse dimensions, and that is for receiving fuel assemblies in a vertical position. Extending up the height of the vertical structure 2a, there are disposed in particular arrangements 2b for guiding the displacement of an assembly 3 and carrying auxiliary arrangements for examining, inspecting, and/or measuring fuel assemblies inserted into the structure 2a via its top portion. The installation may also include an arrangement suitable for handling fuel assemblies so as to make it self-contained and independent of the handling means of the nuclear power station. Under such circumstances, the installation makes it possible to do without any of the fuel handling means of the nuclear power station (e.g. a fuel pool bridge) while examining fuel assemblies. This step is then no longer on the critical path of the operations to be performed when stopping a power plant unit.

FIG. 1 shows the moving examination device 3 in its high position 3 and in its low position 3' in the vicinity of the bottom of the pool, with displacement of the examination device 3 between its positions 3 and 3' serving to perform inspections, examinations, or measurements on all portions of the fuel assembly inserted in the vertical structure 2a.

At its top end, the structure 2a includes arrangements 4 and 4' for guiding tools for taking action inside the pool and for inserting a fuel assembly in the structure 2a of the installation 2.

Figure 2:
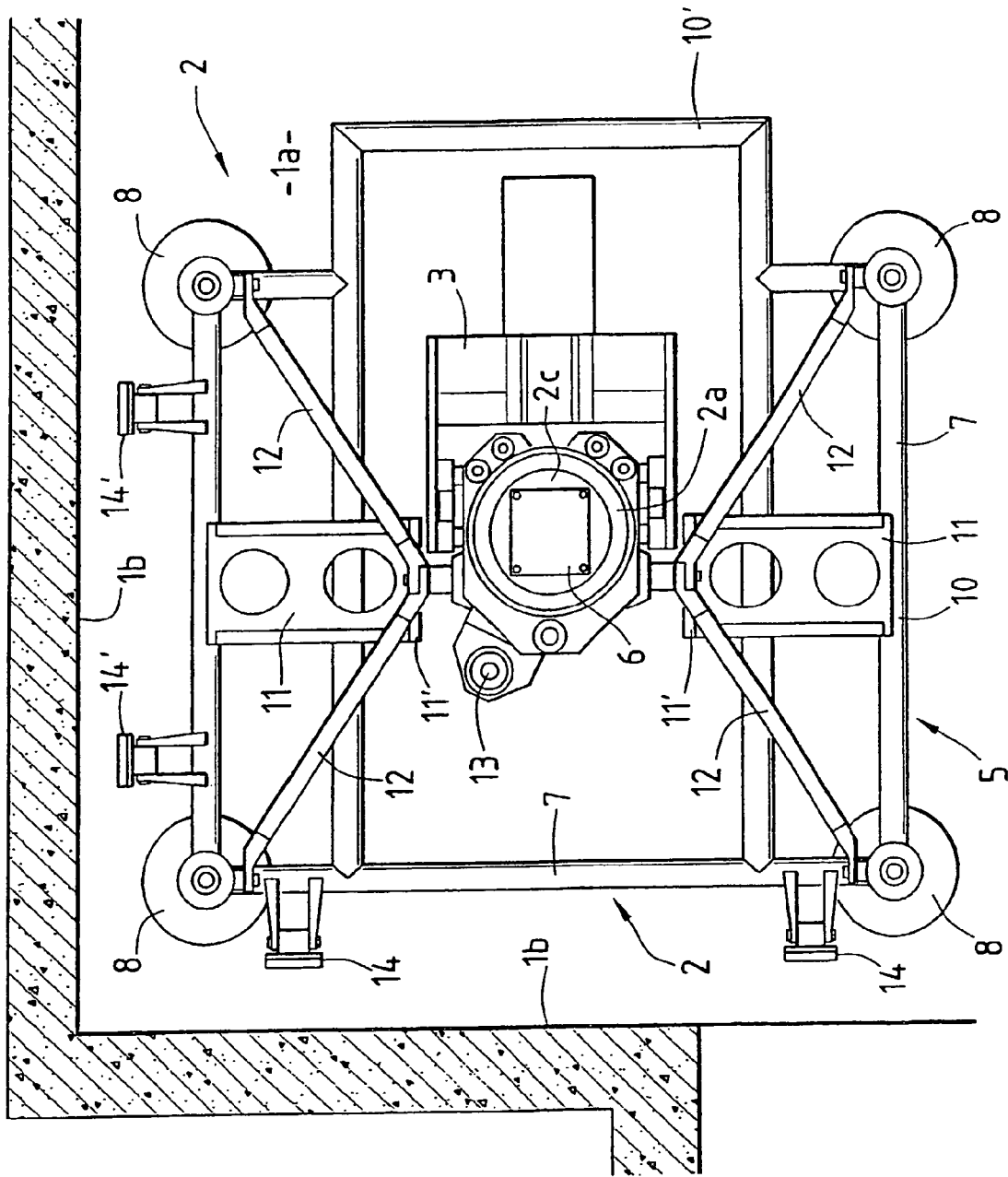
FIG. 2 is a plan view of the installation shown in FIG. 1.

FIG. 2 shows a fuel assembly 6 of right prismatic shape and of square-section in a position enabling inspection and examination in the vertical structure 2a of the installation 2, that is generally cylindrical in shape and of circular section. The fuel assembly rests on a turntable 2c capable of turning about a vertical axis, at the bottom end of the vertical structure 2a.

The installation 2 further includes an assembly 5 for supporting the vertical structure 2a and resting on the horizontal surface of the bottom 1a of the pool 1, via antiseismic pads 8.

As can be seen in particular in FIG. 2, the support device 5 comprises a framework of tubes (or any other assembled-together bars) having a horizontal disposition and resting on the antiseismic pads 8. The frame of the support device 5 includes in particular tubular elements 7 connected at their ends to bushings 9 for fastening the frame of the support device 5 on the antiseismic pads 8. The tubular elements 7 are connected together in pairs at their ends to bushings for fastening on respective antiseismic pads 8, such that the structure rests on the bottom of the pool via an antiseismic pad 8 at each of the corners of the square-shaped frame given overall reference 10.

One of the tubular elements 7 of the square-shaped rigid frame 10 is interrupted in its central portion and comprises only two end portions that are connected to a rectangular frame 10' secured to the frame 10 and co-operating with the frame 10 to support the structure 2a. Support brackets 11 have respective horizontal portions resting on the frames 10 and 10' on either side of the vertical structure 2a and respective upright portions 11' on which the bottom portion of the vertical structure 2a rests, via horizontal trunions engaged in the uprights 11'.

The support device 5 also has four sloping support bars 12 that may be of tubular form and that are connected at one end to a respective antiseismic pad and at the opposite end to a horizontal trunion secured to a portion of the vertical structure 2a. On each of the horizontal trunions secured to the vertical structure 2a there are engaged the end portions of two of the sloping support bars 12 whose opposite ends are connected to respective antiseismic pads 8. The fastener trunions of the sloping bars 12 are secured to the vertical structure 2a at a level that is situated well above the bottom level of the vertical structure 2a, e.g. at a level situated between one-third and one-half of the total height of the vertical structure 2a. This produces stable fastening of the tall and slender vertical structure 2a on the support device 5 of the inspection installation 2.

As can be seen in FIG. 2, the vertical structure 2a has a central portion of circularly cylindrical shape in which there is engaged a fuel assembly 6 for inspection, having its axis vertical; inside this cylindrical portion of the vertical structure 2a, the fuel assembly is mounted so as to be rotatable about its vertical axis on the turntable 2c carried by the support device 5. A motor-driven assembly 13 serves to turn the turntable 2c about a vertical axis so as to present each of the side faces of the fuel assembly in succession to the examination and inspection device 3.

Two of the tubular elements 7 of the frame 10 carry thrust abutments 14 and 14' of the examination and inspection installation 2 in lateral dispositions to engage two of the walls of the pool that are at 90° to each other, such as the walls 1b. The examination and inspection device 2 can be placed in any location on the bottom 1a of the pool, and in particular in the vicinity of a vertical wall 1b, with or without the abutments 14 pressing against the vertical wall.

Figure 3:
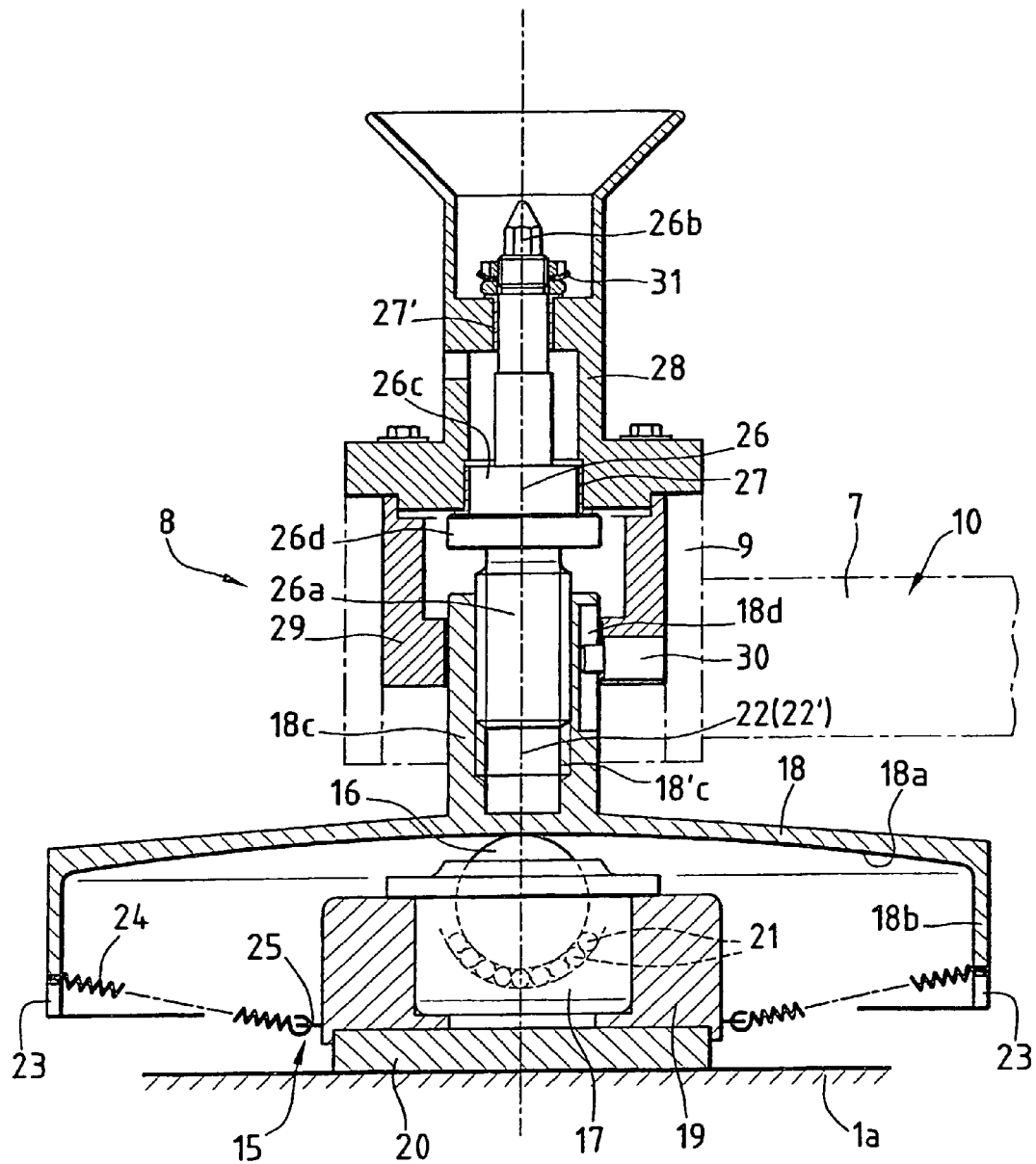
FIG. 3 is a fragmentary vertical section view of an antiseismic pad of a support device of the installation shown in FIGS. 1 and 2.
Figure 4:
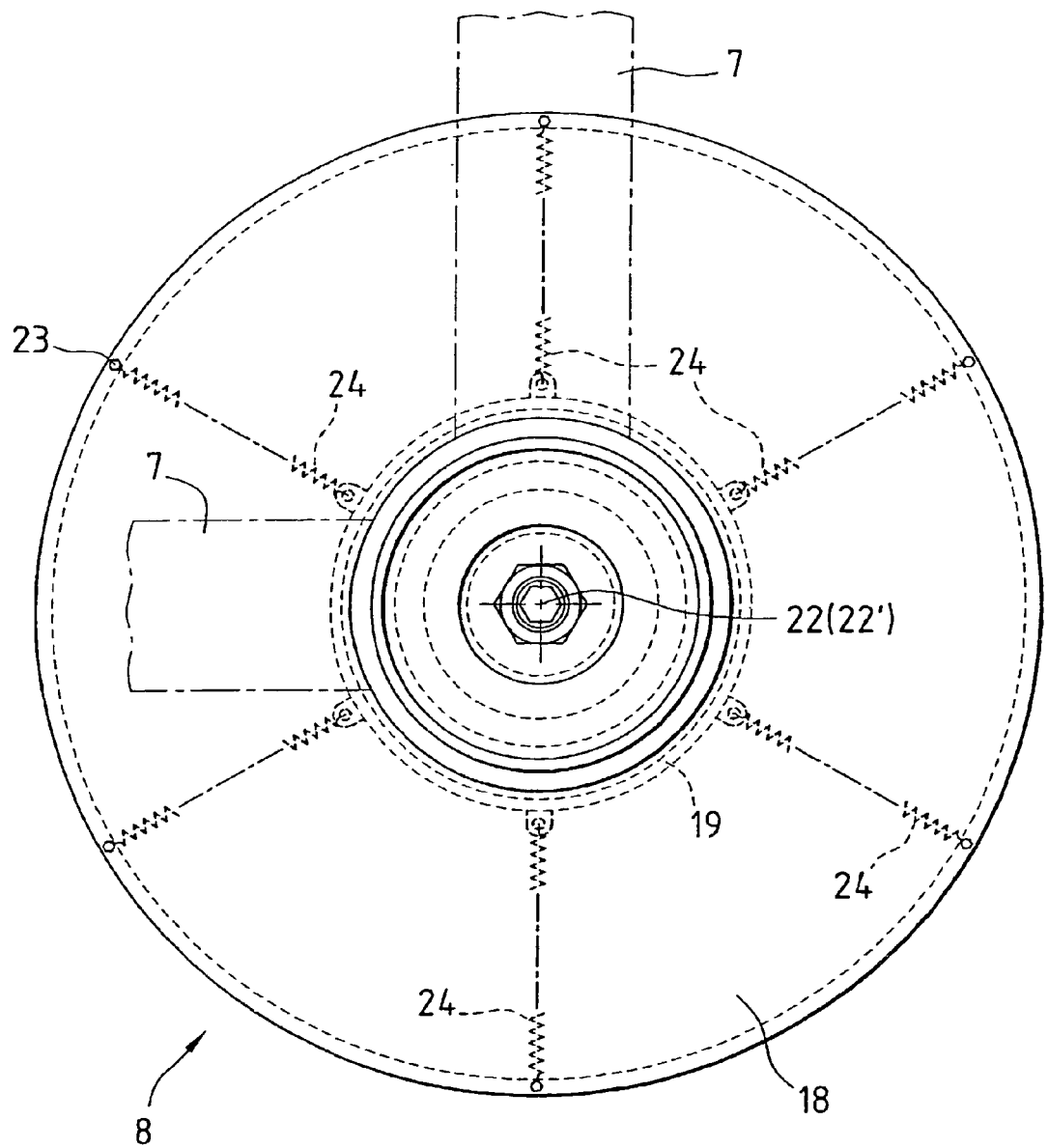
FIG. 4 is a plan view of the antiseismic support pad shown in FIG. 3.

FIGS. 3 and 4 show an antiseismic support pad of the support device 5 of the installation 2, respectively in a fragmentary vertical section view and in a plan view.

The antiseismic pad 8 comprises in particular a support base 15 resting on the bottom 1a of the pool, a spherical rolling element 16 mounted to rotate freely about a center of spherical rotation inside a ball bearing 17 secured to the support base 15, and a support plate 18 resting on the rolling element 16 via an internal support surface 18a that is concave and in the form of a spherical cap having a large radius of curvature.

The internal support surface 18a of the support 18 could present a shape other than a spherical shape, for example it could be conical, ellipsoidal, or paraboloidal in shape. Any circularly symmetrical concave surface could be envisaged. Such a shape for the support surface 18a serves to enable the support plate to be returned towards a position in which the axis of revolution of the support surface is situated on the vertical axis of the pad, and in the absence of any laterally-directed force.

In the invention, the support base 15 includes in particular a soleplate 20 for resting freely on the bottom 1a of the pool and for holding the antiseismic pad 8 that is supporting the examination and inspection installation 2 in place without using fastener means engaging the bottom of the pool. The soleplate 20 is made of a material presenting a large coefficient of friction relative to the support surface of the bottom 1a which is generally constituted by stainless steel sheet. For example, the soleplate 20 may be made of a polymer whose coefficient of friction on a stainless steel surface is at least 0.5. Under such circumstances, given that the weight in water of the structure is about 1300 decanewtons (daN), the resistance to sliding presented by the set of pads in contact with the bottom is about 650 daN.

The soleplate 20 has secured thereon a support 19 for mounting the ball bearings 17 in which the ball 16 is mounted to rotate freely about its center. The support base 15 comprises the assembly constituted by the soleplate 20, the support 19, and the ball bearing 17 assembled together in rigid manner.

The ball bearing 17 comprises a cup having a substantially hemispherical concave surface in which there are disposed rows of bearings balls 21 separated from one another by bearing cage elements occupying sectors of the hemispherical surface. The rolling element 16, constituted by a strong rigid spherical body of steel, rests on the bearing balls 21, the cavity of the hemispherical bearing 17 having a radius greater than the radius of the spherical element 16 and a length substantially equal to the diameter of the balls 21, such that the spherical element 16 and the hemispherical cavity of the bearing 17 present a common center that is the center of free rotation for the spherical element 16 in the ball bearing 17. The axis 22 of the antiseismic pad 8 is the axis of the bearing 17 passing through the center of the hemispherical cavity and extending perpendicularly to the bearing surface of the soleplate 20 on the support surface 1a. This axis is vertical when the surface 1a is accurately horizontal, as shown in FIG. 3.

Instead of a bearing having balls in a hemispherical cup, it is possible to envisage using any concave surface in which the spherical rolling elements can move in contact with a rolling arrangement of one or more bearings, or directly in contact with the concave surface of the bearing. By way of example, such a contact surface could be conical, ellipsoidal, or paraboloidal in shape. In any event, the bearing surface serves to hold the spherical rolling element with its center on the axis of the bearing or to apply a return force to the rolling element so that its center lies on the axis of the concave surface in the absence of any applied lateral force. The transverse dimensions of the concave surface of the bearing when the spherical element moves freely on said concave surface should be sufficient to enable the spherical element to be held on the concave surface of the bearing for earthquakes of the greatest foreseeable magnitudes.

The support plate 18 comprises a disk-shaped portion constituting the plate proper with its bottom surface 18a in the form of a spherical cap coming into contact with the freely rotatable spherical element 16 on which the plate 18 rests. At the periphery of its disk-shaped portion, the plate 18 has a cylindrical rim 18b about the axis 22' of the plate 18, which axis is shown in FIG. 3 as coinciding with the vertical axis 22 of the pad 8, i.e. the axis of the ball bearing 17 perpendicular to the surface 1a. At its bottom portion, the cylindrically-shaped perpendicular portion 18b of the plate 18 has openings 23 for hooking to first ends of coil springs 24 whose second ends are connected to respective hooking tabs 25 projecting from the outer perpendicular surface of the element 19 for securing the bearing 17 to the soleplate 20.

As can be seen in FIG. 4, six springs 24 are disposed in radial directions around the axis 22 of the antiseismic pad 8 in such a manner that the longitudinal traction directions of any two successive springs 24 make an angle of about 60° relative to each other.

The openings 23 for securing the first ends of the springs 24 to the internal peripheral edge of the plate 18 are spaced apart at constant distances around the periphery of the plate 18, and likewise the hooking tabs 25 for the second ends of the springs 24 are spaced apart at regular distances around the outer periphery of the part 19 for securing the bearing 17 to the soleplate 20.

The springs 24 are prestressed in traction on assembly so as to urge the support base 15, the ball bearing 17, and the spherical rolling element 16 towards the axis 22' of the support plate 18, whenever the soleplate 20 is not in contact with a support surface 1a, the assembly comprising the support base 15, the bearing 17, and the spherical element 16 then being suspended beneath the support plate 18. The springs 24 are preferably slightly inclined relative to a horizontal plane so that the longitudinal traction direction of the springs 24 is directed outwards and upwards, i.e. going from the support base 15 towards the perpendicular edge 18b of the base 18.

Figure 7:
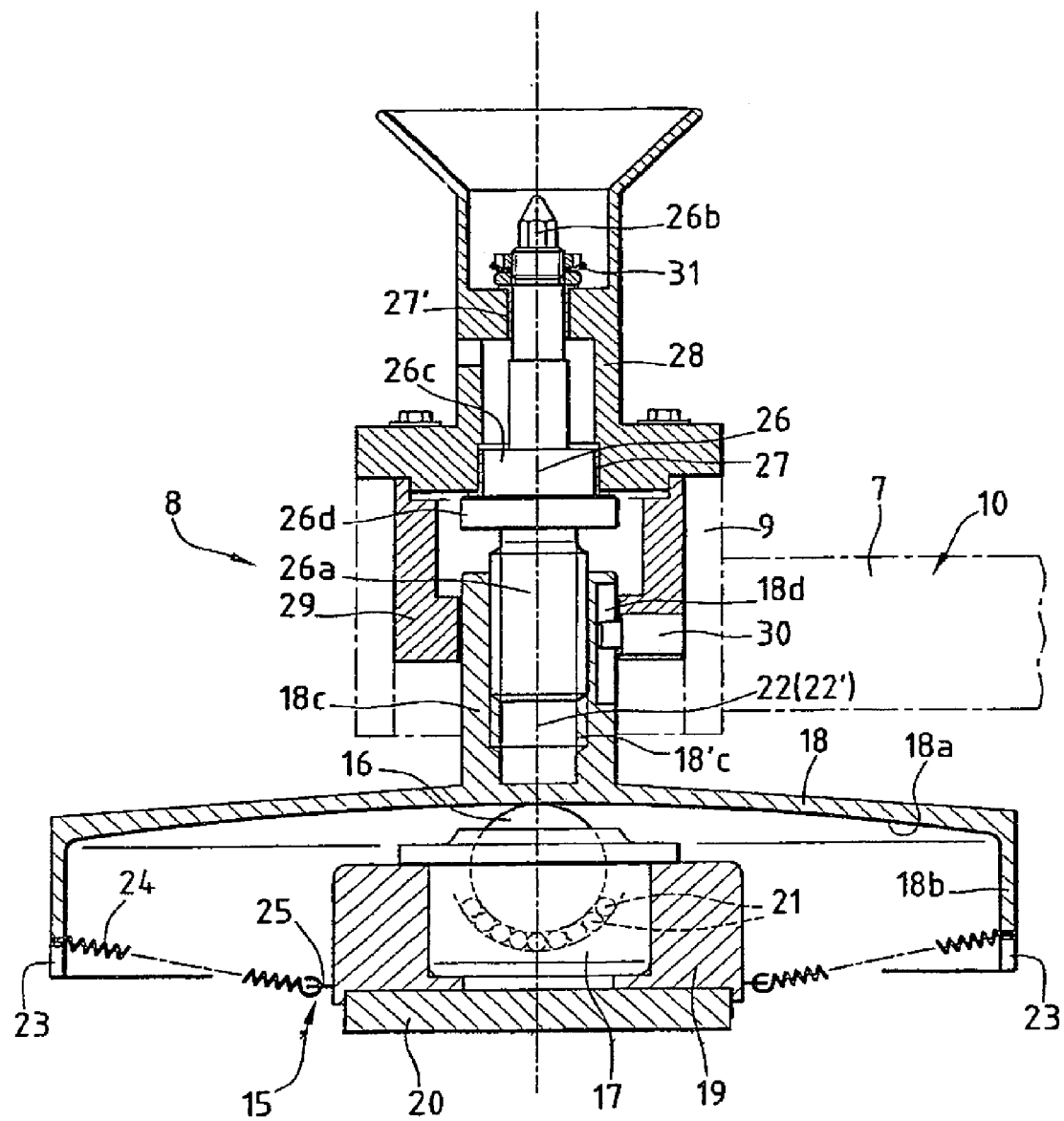
FIG. 7 shows a fragmentary vertical section view of an antiseismic pad of a support deice of the installation wherein the soleplate is not in contact with a support surface.

FIG. 7 shows soleplate 20 not in contact with a support surface. When the soleplate 20 is not with a support surface, e.g. while the examination and inspection installation 2 is being transported and handled in a vertical position prior to being placed on the bottom of the pool, the assembly constituted by the support base 15, the bearing 17, and the spherical rolling element 16 is urged by the spring 24 into a position such that the support base 15 and the ball bearing 17 present a vertical axis on the axis 22' of the plate 18, the spherical element 16 having its center on said axis 22' and being held in contact with the bearing surface 18a of the plate 18 on the axis 22'. The bearing surface of the soleplate 20 is then perpendicular to the axis 22' of the plate 18.

During an earthquake, the support plate 18 moves relative to the base 15 under the effect of laterally-directed forces. The diameter, or more generally the transverse dimensions of the internal bearing surface of the support plate, are such that during displacement of the support plate relative to the bearing, under the effect of an earthquake, the bearing surface of the plate remains in contact with the spherical rolling element. In the event of an earthquake of very large magnitude, the rim 18b of the plate serves to keep the plate engaged on the base 15 by an abutment effect.

The plate 18 has a top portion in the form of a bushing on the axis 22' of the plate, extending the central top portion of the plate over a certain height along the axis 22'. The bushing 18c has an internally-tapped portion 18'c extending over practically the entire length of its bore on the axis 22', and a longitudinal guide slot 18d extending parallel to the axis 22 and opening out in the side surface of the bushing 18c, and extending over a fraction of the length of the bushing 18c.

A shaft 26 having a threaded bottom portion 26a of thread complementary to the thread of the tapped portion 18'c of the bushing 18c is engaged by screw-fastening inside the tapped bore 18'c of the bushing 18c of the plate. At its end remote from the threaded portion 26a, the shaft 26 has a shaped portion 26b, e.g. of hexagonal section. The axis of the shaft 26 extends along the axis 22' of the plate 18 when the shaft 26 has its threaded portion 26a screwed into the tapped bore 18'c of the bushing 18c.

In its central portion, between its threaded portion and its shaped-end portion 26b, the shaft 26 has two diametrically-enlarged cylindrical portions 26c and 26d, the portion 26c being surrounded by a smooth bearing lining 27 which is held axially by the enlarged portion 26d. The smooth bearing 27 at the periphery of the portion 26c of the shaft 26 is inserted in a portion of the internal bore of a tubular engagement part 28 that is rigidly secured to a holding and guide part 29 of tubular shape, the parts 28 and 29 being held by the smooth bearing 27 around the portion 26c of the shaft 26 and to a second smooth bearing 27' in a coaxial disposition about the shaft 26, itself coaxially engaged in the tapped bore 18'c of the plate 18.

The guide part 29 includes a guide element 30 secured in a radial disposition comprising a guide finger that is slidably engaged in the slot 18d in the bushing 18c of the plate 18.

A set of nuts and washers 31 screwed onto the portion of the shaft 26 adjacent to its shaped portion 26b serves to hold an end portion of the second smooth bearing 27' against the part 28, and via the enlarged portion 26d and the bearing 27 serves to hold the shaft 26 against the bottom surface of the part 28. The shaft 26 is thus secured relative to the parts 28 and 29 in translation along the axis 22 while being free to turn relative to the part 28 via the smooth bearings 27 and 27'.

When the shaft 26 is turned, using a tool secured to the end of a pole engaging the shape element 26b, and depending on the direction in which the shaft 26 is turned, the threaded portion 26a of the shaft is screwed into or out from the tapped bore 18'c of the plate 18. The guide part 29 which is secured to the part 28, itself secured in translation to the shaft 26, cannot turn and the plate 18 is prevented from turning because the guide finger 20 is engaged in the slot 18d. The set of parts 28 and 29 thus moves in translation along the axis 22.

In FIGS. 3 and 4, chain-dotted lines show the tubular elements 7 and the connecting sleeve 9 of the frame 10 of a support device 5 for an examination and inspection installation as shown in FIGS. 1 and 2.

The frame 10 of the installation support device 5 is connected at each of its corners via a sleeve 9 to the guide part 29 and to the part 28 for rotary engagement and assembly with the shaft 26 of an antiseismic pad 8. In this way, when the antiseismic pad 8 rests via its soleplate 20 on a support surface 1a, it is possible by turning the shaft 26 in one direction or the other to move a corner portion of the support device vertically either up or down. It is thus possible to adjust the inclination of the frame 10 of the support 5 and thus the inclination of the vertical structure 2a of the installation 2. The axis 22' of the parts 28 and 29 for engaging and guiding the antiseismic pad 8 tilts relative to the direction of the axis 22 of the base 15 and of the bearing 17 which is generally vertical. The bushing 18c of the plate 18 of the antiseismic pad which is engaged with very small clearance inside the guide part 29 and whose slot 18d is engaged with the finger of the guide element 30 of the part 29 is constrained to pivot with the part 29 relative to the axis of the support base 15 perpendicular to the support surface of the soleplate 20 and of the bearing 17, which is made possible by the plate being connected to the support base 15 solely by the springs 24 and resting on the rolling spherical element 16.

When the support surface 1a is not accurately horizontal or includes portions that are inclined relative to the horizontal plane, the soleplate 20 of the antiseismic pads, or of some of the antiseismic pads, can take up a position in which it is not accurately horizontal, such that the axis 22 of the support base 15 and of the bearing 17 is not accurately vertical. Under such circumstances, the axes 22' of the plates 18 of the antiseismic pads 8 of the examination and inspection installation 2, or at least some of the antiseismic pads, move out of alignment relative to the axes 22 of the ball bearings extending perpendicularly to the soleplates of the corresponding pads 8. This adaptive misalignment while positioning the installation including the antiseismic pads is possible at each of the pads because of the floating mount of the plate 18 on the rolling element 16 and because of the support base 15 being connected thereto solely via the springs.

In order to put an installation 2 as shown in FIGS. 1 and 2 into place on the bottom 1a of a nuclear power station pool 1, use is made of a transport and handling arrangement which is moved inside the pool 1 to vertically over the location where the examination and inspection installation is to be placed. Using the handling device, the installation is lowered vertically until the antiseismic pads 8 come into contact with the support surface 1a at the bottom of the pool via their soleplates. As explained above, when the bottom surface 1a of the pool is not accurately horizontal, the antiseismic pads 8 can easily compensate for departures from the horizontal because of the floating mount of the plates 18 on the support bases 15 via the rolling elements 16.

The soleplates 20 of the four antiseismic pads 8 can thus rest accurately flat on the support surface at the bottom 1a of the pool 1.

While the installation 2 secured to the handling means is being transported, the support bases 15 of the antiseismic pads are suspended from the plates 18 of said pads by the springs which serve to urge each support base and its bearing towards a centered position, i.e. such that the axis 22 of the ball bearing perpendicular to the soleplate 20 lies on the axis 22' of the plate 18 for each of the antiseismic pads, the rolling element 16 also being kept in contact with the bottom bearing surface of the plate 18. The installation is thus put into place with its support bases in ideal orientations relative to the support device.

When the installation 2 has been placed on the bottom of the pool via its antiseismic pads 8, the vertical position of the structure 2a is verified, e.g. by an inclinometer, and the inclination of the vertical structure is adjusted so that its axis becomes accurately vertical by adjusting the inclination of the support device 15. This adjustment is performed by varying the heights of the antiseismic pads 8, as explained above. This ensures that the examination and inspection station 2 is put accurately into place and is adjusted to be accurately vertical.

During an earthquake, horizontal lateral forces are exerted on the structure 2a of the installation resting on the antiseismic support pads 8. The support plates 18 of the pads 8 move relative to the corresponding bases by rolling on the corresponding spherical elements 16, and subsequently return towards the equilibrium position under gravity. Lateral forces can thus be accommodated without damage by the structure of the installation, e.g. for accelerations of the kind taken into account for nuclear power stations in France. Under such circumstances, it is considered that the floor spectrum (at the bottom of the fuel pool) for accelerations in the event of an earthquake presents zero period acceleration (ZPA) lying in the range 0.2 g to 0.4 g (where g is acceleration due to gravity), these values being the result of a ground level spectrum having ZPA lying in the range 0.1 g to 0.3 g.

Figure 5:
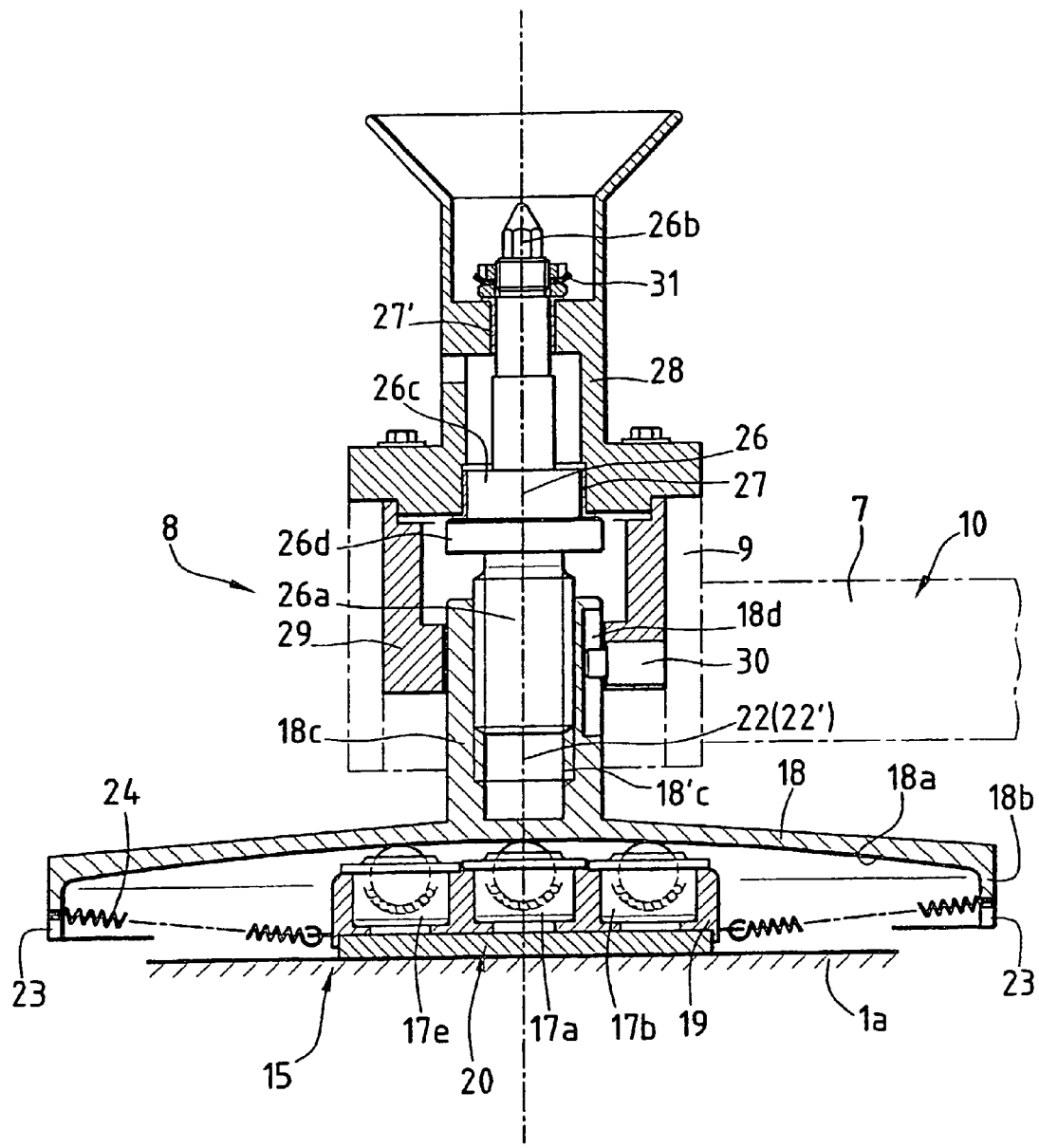
FIG. 5 is a fragmentary vertical section view, analogous to the view of FIG. 3, showing an antiseismic pad in a variant embodiment.
Figure 6:
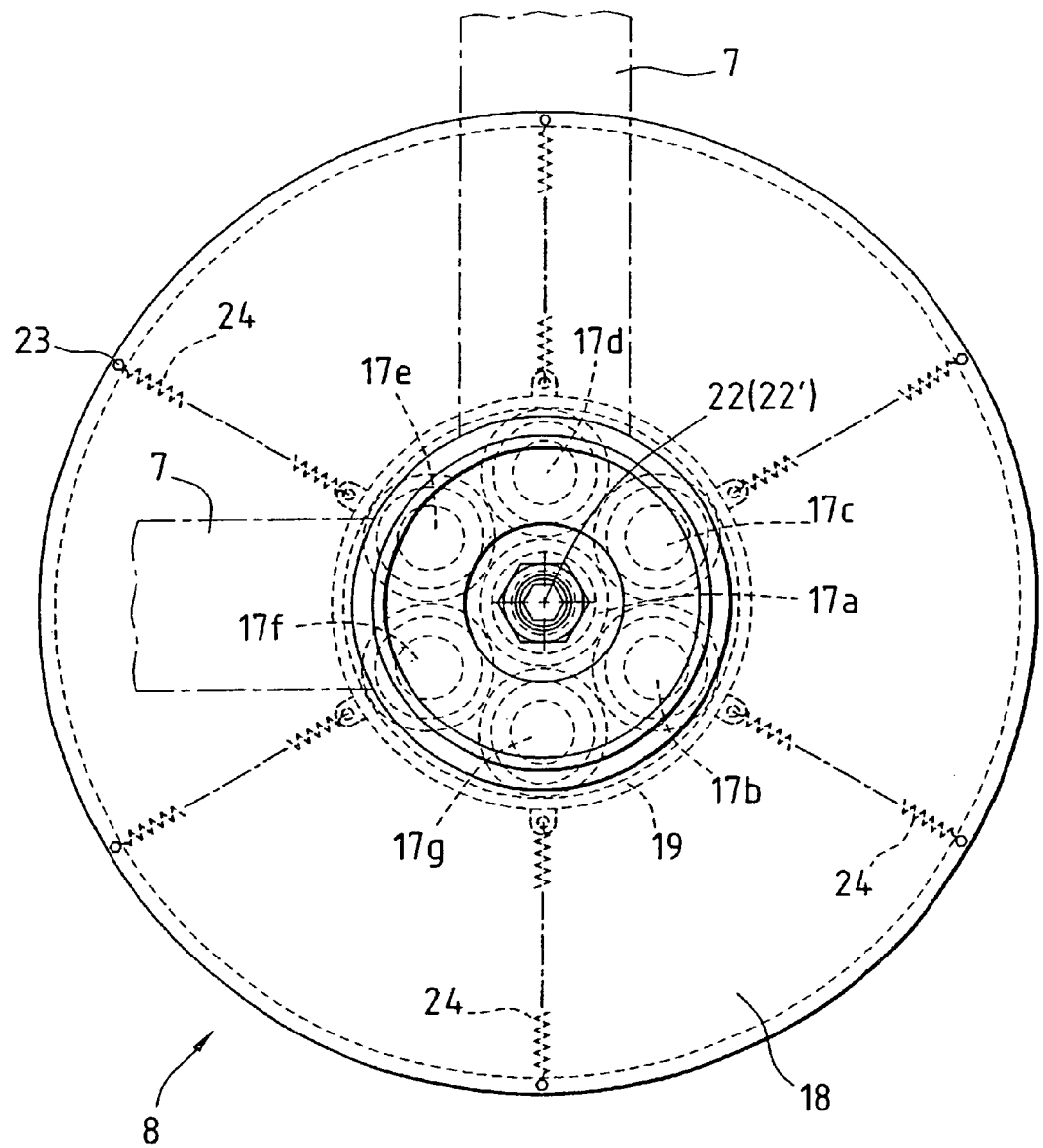
FIG. 6 is a plan view of the antiseismic pad shown in FIG. 5.

FIGS. 5 and 6 show a variant embodiment of an antiseismic pad of the invention which can be used for supporting and adjusting a tall slender vertical structure such as an installation for examining and inspecting fuel assemblies.

Elements in FIGS. 5 and 6 that correspond to elements in FIGS. 3 and 4 are given the same references.

The device in the variant shown in FIGS. 5 and 6 differs from the device shown in FIGS. 3 and 4 as described above solely by the fact that the plate 18 rests on a plurality of spherical rolling elements instead of resting on a single spherical element 16.

In FIGS. 5 and 6, there is shown an embodiment in which the soleplate 20 of the support base 15 is secured to a support 19 suitable for receiving a plurality of ball bearings 17a, 17b, 17c, 17d, 17e, 17f, and 17g each having a respective rolling spherical element 16a, 16b, 16c, 16d, 16e, 16f, and 16g, on which the spherical concave bottom surface of the plate 18 rests.

The ball bearing 17a is located in the central portion of the support 19, with its center of rotation on the axis 22 of the antiseismic pad, while the other six ball bearings are located in 60° dispositions around the axis 22 of the pad and of the central bearing 17a. The corresponding spherical rolling elements 16a to 16g are mounted to rotate freely in the central bearing 17a and in the peripheral bearings whose centers are disposed respectively on the axis 22 of the pad and on a circle centered on the center of rotation of the central bearing (17a).

The operation of the device shown in FIGS. 5 and 6 is identical to the operation of the device having a single bearing and a single rolling element as described above.

The invention is not limited strictly to the embodiments described.

Thus, it is possible to envisage antiseismic pads having a number of bearings and spherical support elements that is different from one or seven, and for example devices with four bearings and four spherical rolling elements, one of the bearings with its spherical rolling element being disposed on the axis of the antiseismic pad while the other three bearings and their spherical rolling elements are disposed at 120° intervals around the bearing of the central rolling element. In any event, the centers of rotation of the rolling bearings are disposed on at least one circle centered on the axis of the bearing or on the axis itself (zero radius circle).

Instead of coil springs for suspension and resilient return purposes, it would be possible to use other devices that perform the same functions.

The antiseismic pad of the invention can be used for supporting structures other than vertical surfaces in which it is desired to be able to adjust the vertical direction. Under such circumstances, the antiseismic pads need not have any arrangements for adjusting their height.

Each antiseismic pad has at least three return means distributed around the axis of the support plate and the support device has at least three pads that are not in alignment. In a support device for a structure whose vertical direction can be adjusted, at least one of the antiseismic pads includes a part that is adjustable in height along the direction of the axis of the support plate.

The antiseismic pad of the invention can be used for supporting transportable structures in fields other than the nuclear industry, and for example in the fields of building and public works.

The invention claimed is:

1. An antiseismic support pad comprising:
a base, the base including a soleplate and a bearing secured to the soleplate, the soleplate, while in contact with the support surface, resting freely on the support surface and holding the base in place on the support surface without a fastener;
a spherical rolling element, the spherical rolling element being mounted in the bearing to rotate freely about a center of rotation in the bearing;
a support plate having a concave bearing surface and resting on the spherical rolling element via the concave bearing surface, the support plate having a support plate axis substantially perpendicular to the soleplate; and
an arrangement configured to suspend the base from the support plate and move the base resiliently in radial directions about the support plate axis when the soleplate is not in contact with the support surface, the arrangement being connected to the support plate and to the base,
wherein the support plate comprises a top portion having a form of a bushing having an axis on the support plate axis, the bushing internally tapped over at least a fraction of its length and including a guide slot opening out in an outer side surface and extending parallel to the axis of the support plate, the antiseismic pad further comprising an actuation shaft having a threaded portion engaged by screw-fastening in the tapped portion of the bushing of the plate along the axis of the plate, and at least one guide and engagement part in which the shaft is mounted to rotate about the axis of the support plate and secured in translation with the at least one guide part including a guide element having a guide peg inserted in the slot of the bushing of the plate for guiding the plate in axial translation, whereby turning the shaft secured in axial translation with at least one engagement and guide part so as to screw it in or out relative to the tapped opening of the bushing of the plate, causes the engagement and guide part to move in translation along the axis of the plate relative to the support plate.

2. A support device for supporting a structure of a transportable installation capable of being put into place on a support surface, the support device comprising:
at least three antiseismic support pads as recited in claim 1; and
a rigid frame resting on the respective support plates of the at least three antiseismic support pads.

3. The support device according to claim 2, wherein the device is configured to enable a vertical direction of a tall and slender structure of an installation secured to the support device to be adjusted, at least one of the at least three antiseismic support pads being adjustable and having a top portion having a form of a bushing having an axis on the axis of the respective support plate, the bushing internally tapped over at least a fraction of its length and including a guide shot opening out in a outer side surface and extending along the axis of the respective support plate, the adjustable antiseismic pad further comprising an actuation shaft having a threaded portion engaged by screw-fastening in the tapped portion of the bushing of the respective support plate along the respective support plate axis, and at least one guide and engagement part in which the shaft is mounted to rotate about the respective support plate axis and secured in translation with the at least one guide part including a guide element having a guide peg inserted in the slot of the bushing of the plate for guiding the plate in axial translation, whereby turning the shaft secured in axial translation with at least one engagement and guide part so as to screw it in or out relative to the tapped opening of the bushing of respective support plate, causes the engagement and guide part to move in translation along the respective support plate axis relative to the respective support plate wherein the engagement and guide part is secured to the rigid frame of the support device and is configured to be movable in translation along the respective support plate axis of the adjustable antiseismic pad by turning the actuation shaft.

4. The support device according to claim 3, wherein the support device has a frame of generally one of square and rectangular shape and wherein the at least three antiseismic pads include four adjustable antiseismic pads, each secured via a respective engagement and guide part to a respective corner portion of the frame.

5. The antiseismic support pad according to claim 1, further comprising:
a further spherical rolling element disposed in a further bearing, wherein centers of rotation of the bearing and further bearing are disposed on at least one circle centered on the support plate axis.

6. The antiseismic support pad according to claim 5, further comprising a center bearing having a center of rotation at the support plate axis.

7. The antiseismic pad according to claim 1, wherein the bearing is a ball bearing.

8. The antiseismic pad according to claim 7, wherein the ball bearing includes bearing balls, and the spherical rolling element rests on the bearing balls.

9. The antiseismic support pad according to claim 1, wherein the concave surface of the support plate bearing against the spherical rolling element is a surface of revolution having one of the following shapes: spherical, conical, paraboloidal and ellipsoidal.

10. The antiseismic support pad according to claim 1, wherein the support pad has a single spherical rolling element rotatably mounted in a ball bearing having a center of rotation disposed on the axis of the support plate.

11. The antiseismic support pad according to claim 1, wherein the arrangement configured to suspend the base from the support plate and move the base resiliently in radial directions about the support plate axis comprises:
   at least three coil springs, each connected at a first longitudinal end to a peripheral portion of the support plate and at a second longitudinal end to an outer peripheral portion of the base disposed inside the peripheral portion of the support plate, each of the springs having a longitudinal direction extending substantially radially relative to the plate and being upwardly inclined from an outer peripheral portion of the base towards a peripheral portion of the plate, the springs being prestressed in traction so as to be configured to move the base of the bearing and of the spherical rolling element resiliently towards a position that is centered relative to the support plate axis and further configured to put the spherical rolling element into contact with the concave bearing surface while the soleplate is not in contact with the support surface, the base freely suspended from the plate via the springs.

\* \* \* \* \*